United States Patent [19]
Islam

[11] Patent Number: 6,043,927
[45] Date of Patent: Mar. 28, 2000

[54] MODULATION INSTABILITY WAVELENGTH CONVERTER

[75] Inventor: Mohammed N. Islam, Ann Arbor, Mich.

[73] Assignee: University of Michigan, Ann Arbor, Mich.

[21] Appl. No.: 09/008,179

[22] Filed: Jan. 16, 1998

Related U.S. Application Data

[60] Provisional application No. 60/051,386, Jul. 1, 1997, and provisional application No. 60/050,813, Jun. 26, 1997.

[51] Int. Cl.$^7$ ........................................... G02F 1/35
[52] U.S. Cl. ............................................. 359/332; 385/122
[58] Field of Search .................. 359/326–332; 385/122

[56] References Cited

U.S. PATENT DOCUMENTS

| | | | |
|---|---|---|---|
| 4,255,017 | 3/1981 | Hasegawa | 385/122 |
| 4,633,524 | 12/1986 | Hasegawa | 359/134 |
| 4,784,450 | 11/1988 | Jain et al. | 359/332 |
| 5,754,334 | 5/1998 | Artiglia et al. | 359/332 |
| 5,778,014 | 7/1998 | Islam | 385/122 X |

FOREIGN PATENT DOCUMENTS

| | | | |
|---|---|---|---|
| 0 268 384 | 5/1988 | European Pat. Off. | G02F 1/21 |

OTHER PUBLICATIONS

Yang et al, "CW fibre optical parametric amplifier with net gain and wavelength conversion efficiency >1", Electronics Letters, vol. 32, No. 25, Dec. 5th 1996, pp. 2336–2338, Dec. 1996.

R.H. Stolen et al., "Parametric Amplification and Frequency Conversion in Optical Fibers", Journal of Quantum Electronics, Jul. 1982, vol. QE–18, pp. 1062–1072.

M.E. Marhic et al., "Broadband fiber optical parametric amplifiers", Optics Letters, Apr. 15, 1996, vol. 21, No. 8, pp. 573–575.

T. Kato, et al, Estimation of nonlinear refractive index in various silica–based glasses for optical fibers, Optics Letters, Nov. 15, 1995, pp. 2279–2281.

Onishi, et al, Highly nonlinear dispersion shifted fiber and its application to broadband wavelength converter, ECOC '97 , Sep. 22–25, 1997, pp. 115–118.

*Primary Examiner*—John D. Lee
*Attorney, Agent, or Firm*—William J. Chervenak

[57] ABSTRACT

Disclosed is an all waveguide fiber wavelength converter which makes use of modulational instability to convert signal wavelength over a conversion bandwidth while maintaining low pump laser power relative to other wavelength conversion devices such as those which make use of four wave mixing. The device is operated in the anomalous dispersion region of the waveguides and the zero dispersion of the waveguide in which conversion occurs is less than the pump wavelength so that conversion may occur for signal wavelengths above and below the zero dispersion wavelength. Conversion efficiency is in the range of 25 dB to 30 dB.

21 Claims, 7 Drawing Sheets

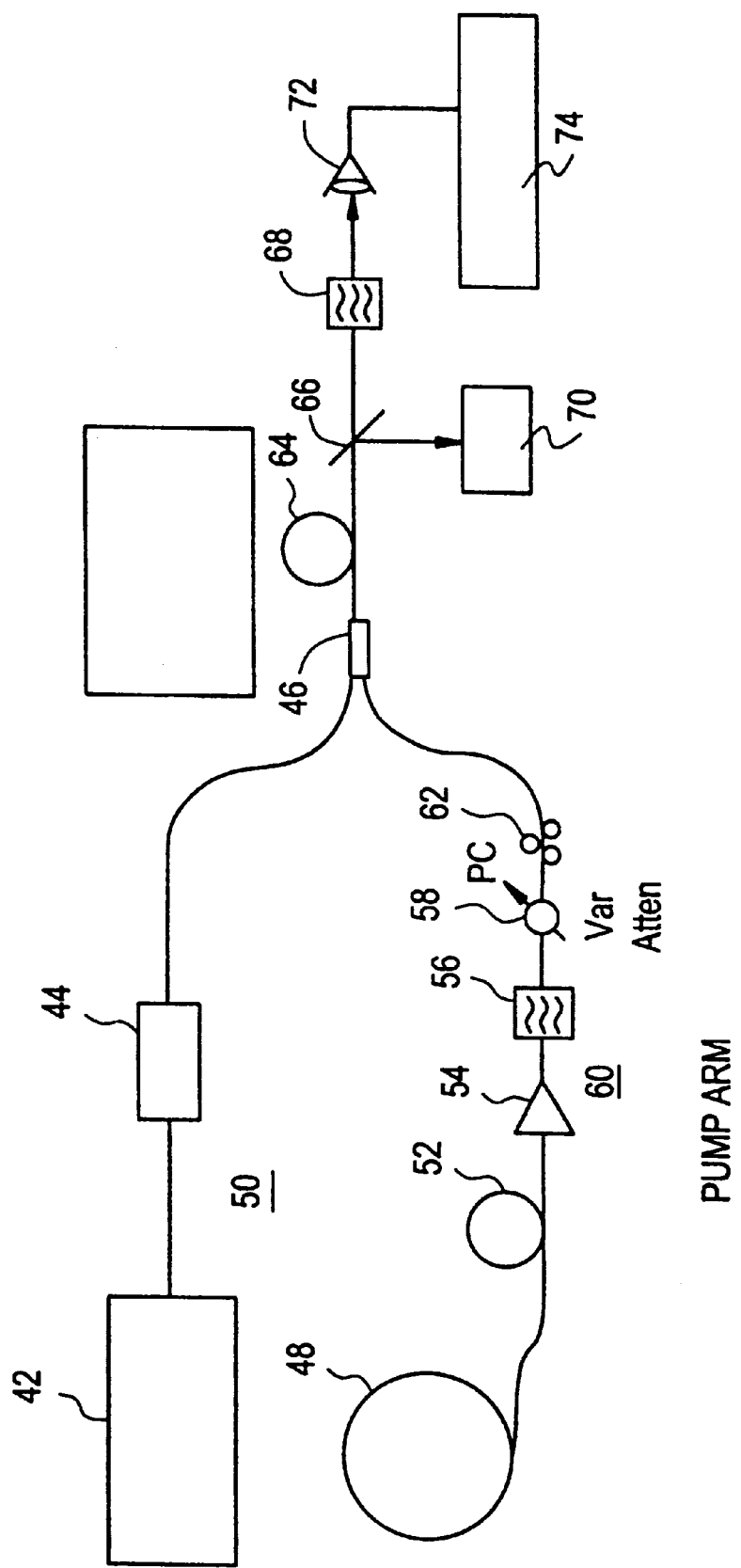

MODULATION INSTABILITY WAVELENGTH CONVERTER

This application is based upon the provisional application Ser. No. 60/050,813, filed Jun. 26, 1997, and provisional application Ser. No. 60/051,386, filed Jul. 1, 1997, which we claim as the priority date of this application.

This invention was made with government support under Department of Defense Contract No. MDA904-94-C-6243.

BACKGROUND OF THE INVENTION

The invention is directed to a wavelength converter which makes use of modulational instability (MI) in a dispersion shifted waveguide fiber to convert the wavelength of an optical signal traveling in a waveguide. In particular, the novel converter makes use of highly non-linear waveguide fiber to achieve wavelength conversion over a wide bandwidth, at high efficiency, using reduced pump power.

Modulational instability (MI) is self phase matched parametric amplification in which the non-linear index of refraction compensates for wave vector mismatch between the pump pulse, and, the signal and converted pulses. That is, the non-linearity of the waveguide, in which the pump pulse and signal pulse overlap, changes the wave vector of the pump pulse to allow pump light energy to transfer into a pulse at the converted wavelength and into the signal pulse. A more thorough explanation of this conversion phenomenon may be found in, "Parametric Amplification and Frequency Conversion in Optical Fibers", R. H. Stolen, J. C. Bjorkholm, Journal of Quantum Electronics, Vol. QE-18, pp. 1062–1072, July, 1982.

The MI in general has a higher conversion efficiency than converters based on four wave mixing. The conversion efficiency of the MI device increases exponentially with length of the waveguide (converter waveguide) in which the signal and pump pulses interact. Also the bandwidth of the MI device can be tuned by changing the pump pulse amplitude, thereby changing the non-linear refractive index.

An additional benefit of the MI device is that it operates in the anomalous dispersion region of the total dispersion vs. wavelength curve. The term anomalous region refers to the portion of the dispersion curve over which shorter wavelength light travel faster in the waveguide than does longer wavelength light. The usual sign convention is dispersion is taken as positive in the anomalous region. In the so called normal region of the dispersion curve, longer wavelength light travels faster and the dispersion is taken to be negative. Thus the pump wavelength is longer than the zero dispersion wavelength of the converter waveguide. Normal manufacturing variations in the converter waveguide fiber will not result in the pump or signal wavelengths falling in the normal dispersion region of the converter waveguide, thereby switching off parametric amplification. Both the converted and the signal pulses may have wavelengths in the anomalous dispersion region so that soliton amplification and switching are made possible. Also, the signal pulse wavelength may be less than or greater than the pump pulse wavelength.

The converter device disclosed in this application may have an all-fiber construction, thus making full use of the mature waveguide fiber technology as well as the associated technologies of connecting, splicing, coupling, filtering and the like.

As demand grows for ever higher data rates incorporated in multi-node architectures, the need for an efficient, wide bandwidth wavelength converter, using readily available components, becomes more urgent.

SUMMARY OF THE INVENTION

The present invention meets the need for a wavelength converter having:
high conversion efficiency;
uniform conversion efficiency over a tuning range which covers the gain band of an erbium doped fiber amplifier, the range from about 1530 nm to 1565 nm;
an all waveguide fiber design; and,
a relatively low pump power requirement, for example, of the order of 100 mW.

What is demonstrated in the present invention is high-efficiency wavelength conversion at low pump powers based on induced modulational instability (MI) in low dispersion, high nonlinearity (Hi-NL) optical fiber. Peak conversion efficiency of +28 dB over a bandwidth of 40 nm was achieved using a pulsed pump with a peak power of approximately 600 mW. By using 720 m of dispersion-shifted (DS) fiber in which the effective nonlinearity has been increased by a factor of ~5×, a 10 dB higher peak conversion efficiency and 5 nm broader bandwidth was reached at lower pump powers than have been previously reported. See, M. E. Marhic, N. Kagi, T. K. Chiang, and L. G. Kazovsky, Opt. Lett., 21, 573 (1996).

A first aspect of the invention is a wavelength conversion device comprising a single mode waveguide fiber carrying signal pulses and a second waveguide fiber carrying pump pulses. These two waveguides are optically joined to respective first and second input ports of a coupler. The coupler is selected to couple both the signal pulses and the pump pulses into a single output port. A third single mode waveguide fiber is optically joined to the single output port and so receives the signal and pump light pulses. The signal and pump pulses are spaced in time such that the two sets of pulses at least partially overlap each other in the third waveguide for at least a portion of their travel time in the third fiber. The third waveguide is characterized by a non-linearity constant greater than about 3 (W-km)$^{-1}$ and a zero dispersion wavelength $\lambda_o$. The wavelength of the pump pulses, $\lambda_p$, is greater than $\lambda_o$.

In an embodiment of the invention, a filter which passes the signal light but reflects or absorbs the pump light is incorporated into the end portion of the third waveguide. The bandpass filter may be, for example, a waveguide fiber grating, a wavelength dependent polarizer, or a non-linear optical loop mirror balanced to reflect the pump light wavelength and transmit the signal light wavelength. The signal and pump light may be coupled to the non-linear optical loop mirror using the same coupler or separate couplers depending upon which configuration is most compatible with overall system design.

In an embodiment of the wavelength converter, the third waveguide has a zero dispersion wavelength, $\lambda_o$, in the range of about 1500 nm to 1550 nm. A preferred range for $\lambda_o$ is about 1520 nm to 1540 nm.

In yet another embodiment of this aspect of the invention, the converted wavelength, $\lambda_v$, follows the inequality, $\lambda_v > \lambda_p > \lambda_s > \lambda_o$. As an alternative embodiment, the converted wavelength, $\lambda_w$, may be such that, $\lambda_s > \lambda_p > \lambda_w > \lambda_o$.

The interaction between the signal light pulses and the pump light pulses in the third single mode waveguide is improved in the case where the polarization of the two sets of pulses is matched. Thus a preferred embodiment of the invention includes a polarization controller in either the first or second waveguide fiber.

Preferred properties of the third waveguide are a slope near $\lambda_o$ in the range of about 0.03 ps/nm$^2$-km to 0.10 ps/nm$^2$-km and a non-linearity constant in the range of about 3 (W-km)$^{-1}$ to 13 (W-km)$^{-1}$.

A second aspect of the invention is a wavelength conversion device configured as in the first aspect except that the first waveguide fiber comprises a first segment in which total dispersion decreases in the direction of single pulse propagation and a second segment having substantially constant total linear dispersion.

In this aspect of the invention, the performance parameters are:

a wavelength conversion bandwidth in the range of about 30 nm to 50 nm; and, peak wavelength conversion efficiency in the range of 25 dB to 30 dB; in which, the third waveguide has a non-linearity constant in the range of about 3 $(W\text{-km})^{-1}$ to 13 $(W\text{-km})^{-1}$ and, for the pump pulses, a peak power in the range of about 550 mW to 650 mW.

In a preferred embodiment the dispersion slope of the third waveguide near $\lambda_o$ is in the range of about 0.03 $ps/nm^2\text{-km}$ to 0.10 $ps/nm^2\text{-km}$.

Yet another aspect of the invention is a method for converting the wavelength of a light signal pulse by launching a signal pulse into a first single mode waveguide and a pump pulse into a second single mode waveguide fiber. The pump and signal pulses are coupled into a third single mode waveguide where the pulses overlap for at least a portion of the time spent in the third waveguide. The pump and signal pulses act together in the third waveguide to convert the pump light energy into light energy of a wavelength different from that of the pump or signal pulses. The wavelength conversion is made efficient by selecting a third waveguide in which the zero dispersion wavelength is less than the pump wavelength and the non-linearity constant is in the range of about 3 $(W\text{-km})^{-1}$ to 13 $(W\text{-km})^{-1}$. A filter which prevents passage of the pump light is optically connected into a portion of the third waveguide spaced apart from the location of the coupler which couples light from the first and second waveguides into the third waveguide. The properties of the third waveguide are as defined above.

The signal pulse may advantageously be shaped using a first waveguide which has a total linear dispersion decreasing segment or portion and a segment in which the total linear dispersion is substantially constant. As is noted above, interaction between the signal and pump pulses may be optimized by including a polarization matching device in either the first or second waveguide.

BRIEF DESCRIPTION OF THE DRAWINGS

FIGS. 1a & 4 are schematics of operational wavelength converters.

DETAILED DESCRIPTION OF THE INVENTION

Figure 1A:
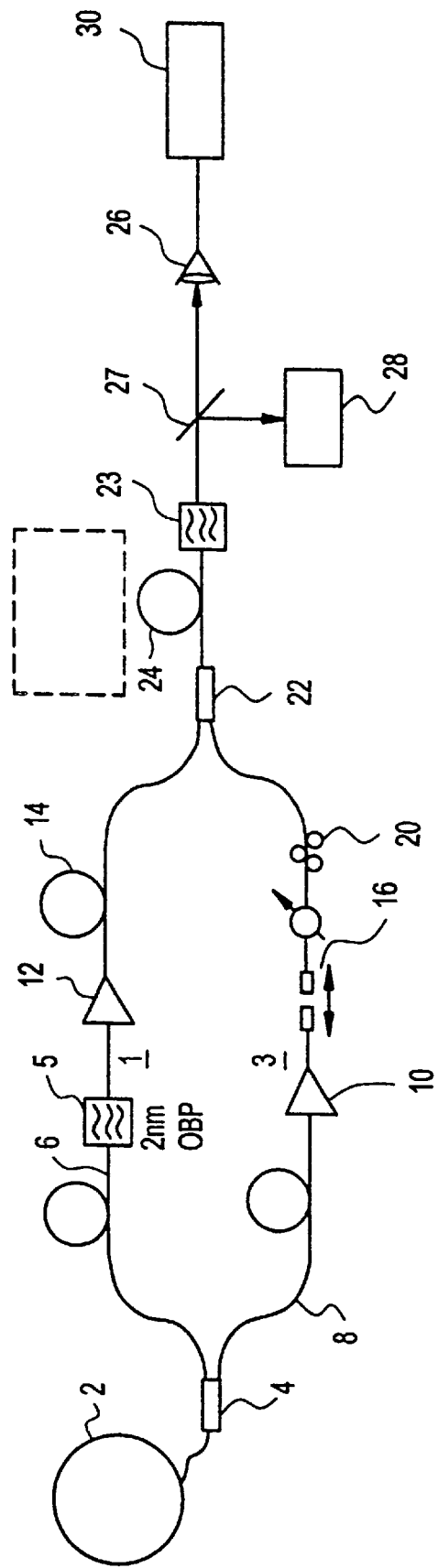

Wavelength conversion enhances the capacity and flexibility of routing protocols in wavelength-division multiplexed networks by enabling wavelength reuse and dynamic switching and routing. It is also an underlying technology for gateways between time-division multiplexed and wavelength-division multiplexed network interfaces. Key performance parameters for wavelength conversion schemes include conversion efficiency, which we define as the ratio of the converted power to input signal power.

In addition, a converter based on the MI parametric process can support almost unlimited bit rates and is transparent to signal modulation format because of the nearly instantaneous response of the third order nonlinearity in fused silica which is the physical basis for the MI wavelength converter.

The use of MI in a wavelength converter has the several advantages listed above. The versatility of this converter derives from the feature in which the converted wavelength is selected by control of the pulse amplitudes.

In the embodiment of FIG. 1, the wavelength converter has erbium doped ring laser 2 as the common source for the signal arm 1 and the pump arm 3. The source power is divided between the two arms 1 and 3 by splitter 4. The signal arm 1 comprises a dispersion decreasing waveguide fiber 6 which is terminated by an optical bandpass filter 5. The filtered signal is amplified by erbium doped fiber amplifier 12 and then travels through step index fiber 14.

The pump arm 3 comprises a step index waveguide 8 which carries the pump pulse to erbium doped amplifier 10. The amplified pulse passes through a variable time delay device 16, a variable attenuator device 18 and a polarization controller 20. The delay device is set to provide overlap of the signal and pump pulses in waveguide 24. The attenuator is used to select the power of the converted pulse. The polarization controller matches the polarizations of the signal and pump pulses to insure optimum interaction of the two sets of pulses. These devices, the variable delay device, the variable optical attenuator and the polarization controller are known in the art and are commercially available and thus will not be further discussed here.

The signal and pump pulses are coupled into waveguide fiber 24 which has a relatively high non-linearity coefficient. Over the length of waveguide 24, light energy from the pump pulse is transferred into a wavelength converted pulse and into the original signal pulse. A narrow width optical bandpass 23 filter blocks propagation of the pump signal out of waveguide 24 while passing the signal pulse and the wavelength converted pulses onto splitter 27 which directs a portion of the signal and converted pulse energy to optical spectrum analyzer 28 and to photodetector 26 which sends an electrical signal to measuring device 30.

Figure 2:
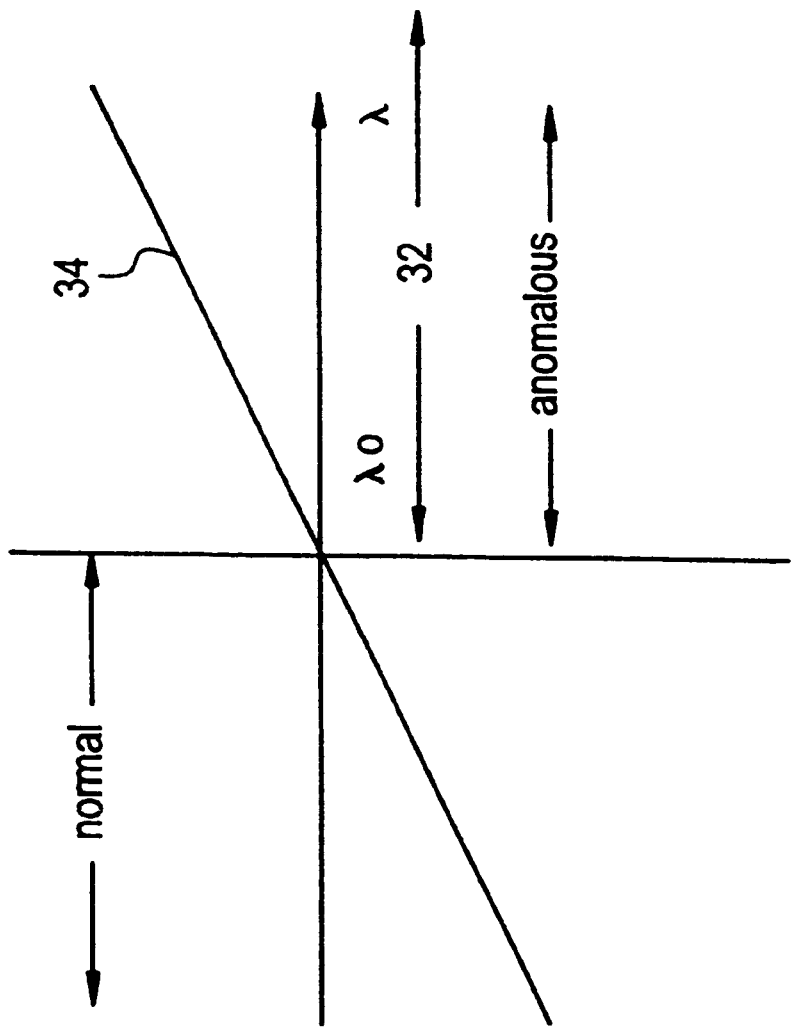
FIG. 2 is an illustration of a chart of total dispersion plotted versus wavelength.

All wavelengths were in the anomalous region 32 of FIG. 2 in which the total dispersion curve 34 shows increasing dispersion as wavelength increases.

EXAMPLE—Performance of the FIG. 1 Wavelength Converter

Ring laser 2 was passively mode locked to provide a 13.3 MHz train of 2.5 ps pulses at wavelength 1546 nm. Splitter 4 provided a 70/30 split between signal arm 1 and pump arm 3, respectively. The pulses generated a spectral continuum in 1.2 km of dispersion decreasing waveguide fiber 6. The zero dispersion wavelength of waveguide 6 was in the range 1530 nm to 1550 nm. Bandpass filter 5, having a bandwidth of about 2 nm, was used to select particular wavelength pulses from the continuum which were then amplified by amplifier 12 to about 12 $\mu W$. The signal pulses were dispersed to a width of 65 ps in about 2 km of standard step index waveguide 14.

In the pump arm 3, the laser pulses were dispersed by standard step index waveguide 8 to a width of 30 ps, and amplified by amplifier 10 to an average power of 600 mW.

The pump pulses, conditioned by delay 16, attenuator 18 and polarization controller 20, were coupled into waveguide 24 by means of 3 dB coupler 22. Waveguide 24 was 1.85 km in length and had zero dispersion at 1524 nm and a nonlinearity coefficient 9.9 (W-km)$^{-1}$. The total dispersion measured at 1546 nm was 1.05 ps/nm-km. The signal and converted wavelengths were selected by the a 0.9 nm bandpass filter 23 and passed on to an oscilloscope 30 after detection by the fast photo-diode 26. Measurements of pulse amplitude on the oscilloscope provided a determination of power gain an conversion efficiency. Any ASE was eliminated by measuring pulses at the repetition rate of the laser.

Figure 1B:
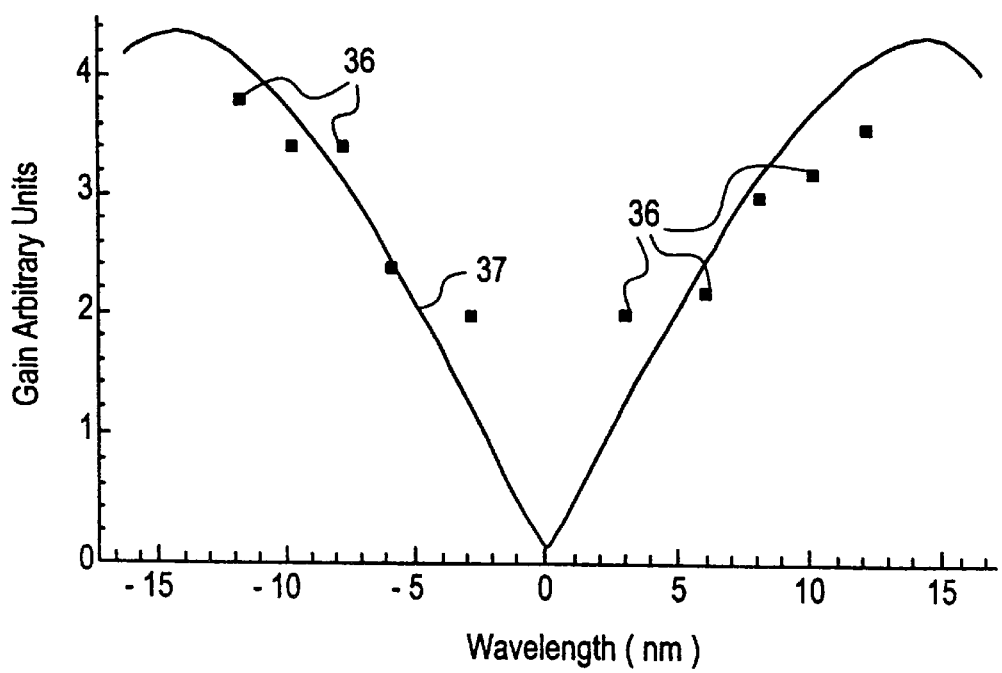
FIGS. 1b & 1c are respective gain and conversion efficiency charts for measurements made using the FIG. 1a wavelength converter.
Figure 1C:
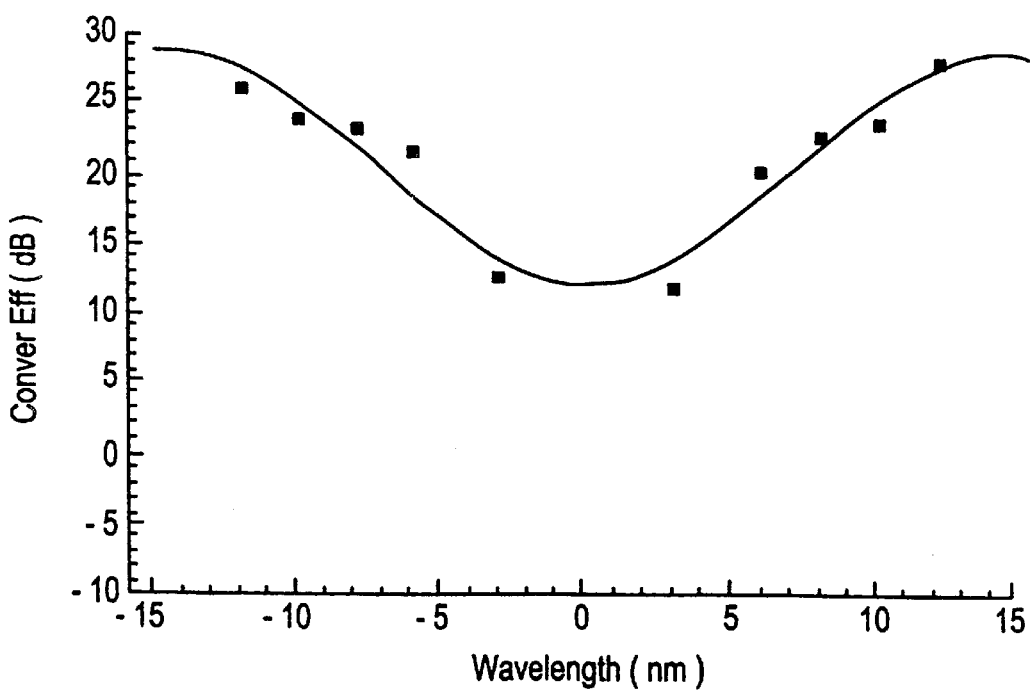

The experimental gain, in arbitrary units, is shown as the ten data points 36 in FIG. 1b. The theoretical gain, solid line 37 in FIG. 1b, is charted versus separation of the signal and pump wavelengths. The solid line 40 in FIG. 1c, the theoretical conversion efficiency is charted versus wavelength separation of signal and pump wavelengths. Note that conversion efficiency data points 38 of FIG. 1c are in good agreement with the theoretical curve 40.

The analytical meaning of the gain and conversion efficiency can be understood in terms of the following discussion. The bandwidth and efficiency of MI-based wavelength conversion depend on the nonlinearity-assisted phase matching of the propagation vectors and the nonlinearity induced parametric gain. If the propagation constants of the copropagating signal, converted wavelength and pump are $k_s$, $k_a$, and $k_p$, respectively, then the linear phase mismatch is $\Delta k = k_s + k_a - 2k_p$. The phase mismatch with induced nonlinearity is, then $$k = \Delta k + 2\gamma P \quad (1)$$

where $$\gamma = \frac{2\pi}{\lambda_p} \frac{n_2}{A_{\mathit{eff}}}$$

is the nonlinearity coefficient of the fiber, $\lambda_p$ is the pump wavelength, $n_2$ is the nonlinear refractive index, $A_{\mathit{eff}}$ is the effective mode-field area, and P is the pump power. The parametric gain is given by, $$g = \sqrt{(\gamma P)^2 - \left(\left[\frac{K}{2}\right]\right)^2} \quad (2)$$

and represents real gain over a conversion bandwidth corresponding to $-4\gamma P < \Delta k < 0$. See 4. R. H. Stolen and J. E. Bjorkholm, IEEE J. Quantum Electron., QE-18, 1062 (1982). If $\Delta k$ is expanded to 3rd order about the pump wavelength and the pump wavelength lies in the vicinity of the zero-dispersion wavelength ($\lambda_o$), it can be expressed as $$\Delta k \approx -\frac{2\pi c}{\lambda_p^2}\left[\frac{dD}{d\lambda}\bigg|_{\lambda_o} (\lambda_p - \lambda_o)\right](\Delta\lambda)^2 \quad (3)$$

where $$\frac{dD}{d\lambda}\bigg|_{\lambda_o}$$

is the third order dispersion of the fiber and $\Delta\lambda = (\lambda_p - \lambda_a) = (\lambda_s - \lambda_p)$ describes the wavelength separation between the pump and signal or converted wavelengths and is half of the conversion bandwidth. Equations (2) and (3), subject to the requirement that g be real, indicate the explicit nonlinearity dependence of the conversion bandwidth experiencing parametric gain is $\Delta\lambda \alpha 2(\gamma P)^{1/2}$.

The MI conversion efficiency, assuming single mode propagation and same polarization for pump, signal, and converted wavelengths is $$\eta = \frac{P_a(L)}{P_s(O)} = \left(\frac{\gamma P}{g}\right)^2 \sinh^2(gL) \quad (4)$$

where L is the fiber length. The derivation of equation (4) ignores pump depletion, fiber loss, competing nonlinear processes, and walk-off between pump and signal when they are pulsed. Because these effects would lower the gain, the conversion efficiency in (4) is effectively maximum. Under a fixed phase-matching condition (i.e. for $\Delta k = -2\gamma P$), the explicit conversion efficiency dependence on nonlinearity is $\eta \alpha \sinh^2(\gamma PL)$.

Comparative Example—Performance of the FIG. 4 Wavelength Converter

The signal arm 50 of the wavelength converter of FIG. 4 made use of color center laser 42 amplitude modulated at 150 MHz by modulator 44 and connected to 3 dB coupler 46. Input signal power was about 1 mW.

An erbium fiber ring laser supplied the pump arm 60 with a 13.3 MHz train of 2.5 ps pulses at a wavelength of 1534.6 nm. The pulses were broadened to about 100 ps in 4 km of standard step index single mode waveguide 52. Erbium optical amplifier 54 amplified the pulses to an average power of 4 mW. The pump pulse was filtered by 2 nm bandpass filter 56, conditioned for optimum interaction with the signal pulses by variable attenuator 58 and polarization controller 62, and connected to 3 dB coupler 46. Coupler 46 coupled the signal and pump pulses into waveguide fiber 64 in which power from the pump pulses was transferred to the signal pulses and to the converted wavelength pulses.

The waveguide 64 had zero dispersion wavelength 1534 nm, non-linearity constant 9.9 (W-km)$^{-1}$, and length 720 meters. The attenuation of waveguide 64 was about 0.6 dB/km and the dispersion slope was 0.05 ps/nm$^2$-km. Note that a low dispersion slope improves the wavelength converter performance with regard to conversion wavelength bandwidth. Splitter 66 sent a portion of the signal and converted wavelength signal to optical spectrum analyzer 70. The remaining portion of the signal and converted wavelength power was filtered by 2 nm bandpass filter 68, and detected by fast photo-diode 72 which sent an electrical signal to oscilloscope 74.

Figure 5:
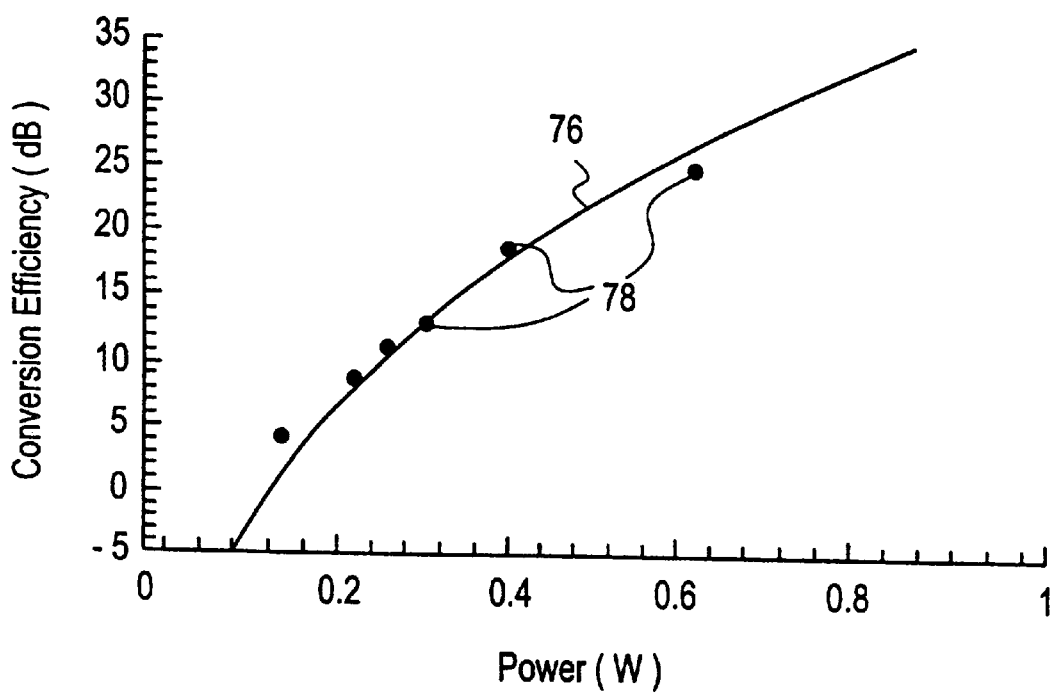
FIG. 5 is a chart of power conversion efficiency versus pump power.

The conversion efficiency, i.e., the ratio of converted signal power to input signal power, of the device of FIG. 4 increased rapidly with increasing pump power as is shown by data points 78 in FIG. 5. The saturation of the conversion efficiency is due to non-linearity induced pump and signal pulse broadening and the appearance of numerous higher order converted wavelengths. The solid curve 76 is a theoretical curve based on the conversion efficiency equation given above and assumes a signal to pump wavelength separation of 10.4 nm.

Figure 6:
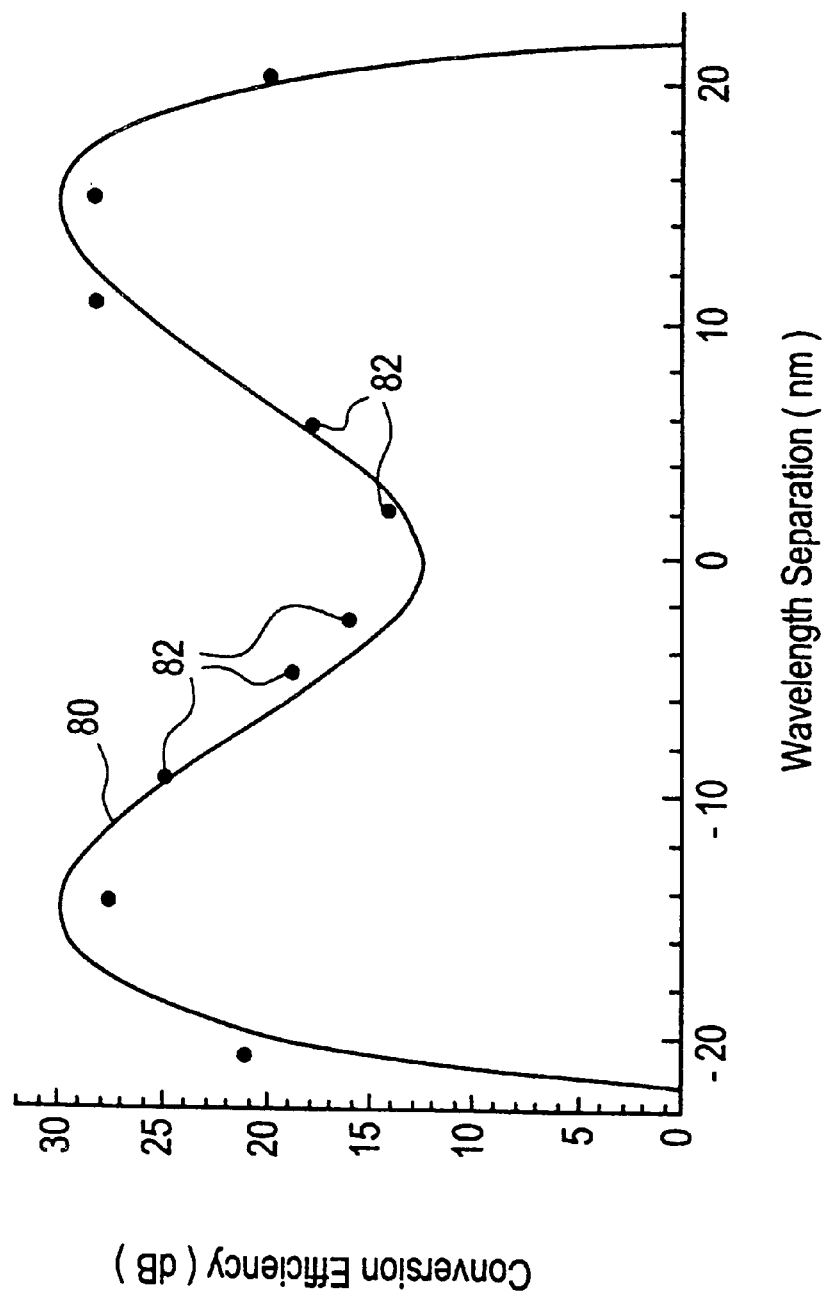
FIG. 6 is a chart of power conversion efficiency versus separation between pump wavelength and converted wavelength.

The conversion efficiency as a function of pump pulse and signal pulse wavelength separation is shown in FIG. 6. Note the maximum conversion efficiency is 28 dB and the effective conversion bandwidth is about 40 nm. Advantageously, these results are obtained using a pump power of about 600 mW, an order of magnitude less than has been reported in the art. As before the solid curve 80 is the conversion efficiency expressed in dB. Data points 82 are in good agreement with the theoretical curve 80.

Figure 3A:
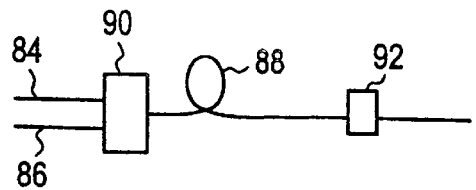
FIG. 3a–d are schematics of embodiments of the wavelength converter.

It will be understood that the invention may be practiced using numerous variations on the basic optical circuits shown in FIGS. 1a & 4. For example, FIG. 3a shows an embodiment in which the signal waveguide 84 and the pump waveguide 86 are coupled by coupler 92 into a dispersion shifted waveguide 88 which has a high non-linearity coefficient. The total dispersion of the dispersion shifted waveguide at the pump wavelength may advantageously be about 0.4 ps/nm-km. Filter 92 passes the signal and converted wavelengths and blocks the pump wavelength.

Figure 3B:
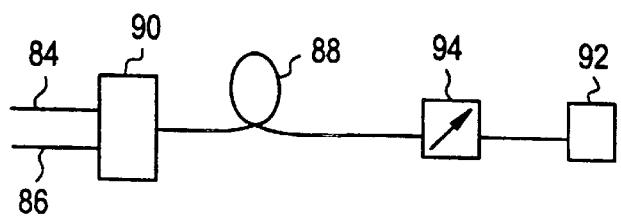

The embodiment shown in FIG. 3b is essentially identical to that of FIG. 3a except that polarization filter 94, which blocks the pump wavelength, is inserted at the end of waveguide 88 just before the filter 92. In this embodiment filter 92 may not be required which would probably improve the strength of the transmitted original signal and the converted wavelength signal.

Figure 3C:
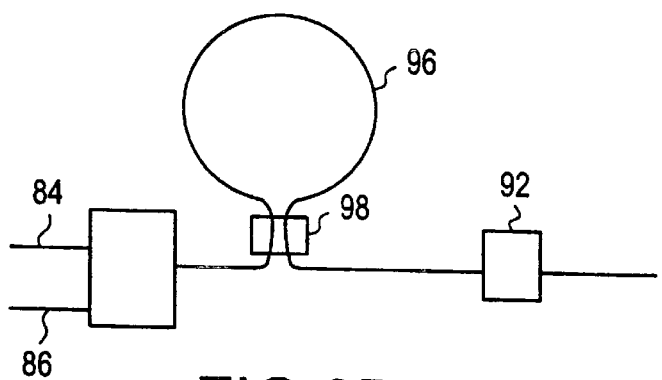

The embodiment of FIG. 3c incorporates the dispersion shifted waveguide into a non-linear optical loop mirror 96. Coupler 98 is chosen to propagate the original signal in a clockwise direction around the loop, whereas the pump signal is coupled to propagate half the pump power in each of the clockwise and counter-clockwise directions. The pump wavelength filter 92 reflects pump light back to the coupler at the base of the loop mirror thus removing the pump light from the signal light propagated along the continuation of the optical communications link.

Figure 3D:
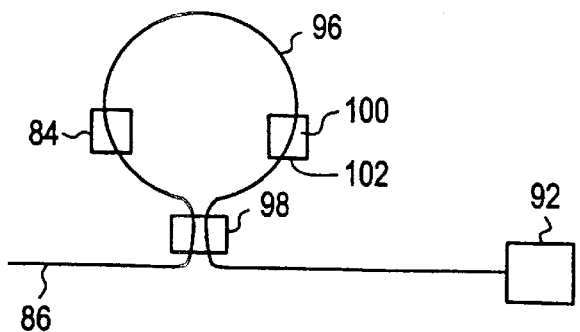

An alternative configuration using a non-linear loop mirror is shown in FIG. 3d. In this case, the pump power is coupled into the bottom of the loop 96 and is split to propagate both clockwise and counter-clockwise around the loop. As before filter 92 serves to return unused pump power to the loop mirror. The signal 84 is coupled at a point on the loop spaced apart from the pump power coupler. The signal propagates in a clockwise direction around the loop, interacts with the pump light, and the signal and the converted wavelength signal are coupled out of the loop mirror by coupler 100 and continue to propagate along waveguide 102.

Numerous applications for the MI wavelength converter device in high density networks at all levels of telecommunication architecture. Because the novel wavelength converter has as output both the original signal and a wavelength converted signal, the device may be used in logic circuits as well.

Thus the novel converter has the advantages of:
all waveguide fiber construction which allows use of the mature waveguide and waveguide component and connection technology;
high efficiency at lower pump power;
wide bandwidth; and,
excellent versatility in meeting diverse requirements.

The examples of the invention have demonstrated wavelength conversion over at least 40 nm with a peak efficiency of 28 dB at 600 mW pump power by making use of induced modulation instability in dispersion-shifted fiber, i.e., $\lambda_o$ shifted near to the 1550 nm operating window, with a 5× enhancement of effective nonlinearity. The nonlinearity enhancement reduces pump power requirements by a factor of 5 and improves the peak efficiency by a factor of 900 over corresponding lengths of conventional DS fiber for similar conversion bandwidths.

Although specific embodiments of the invention have herein been disclosed and described, the invention is nonetheless limited only by the following claims.

We claim:

1. A wavelength conversion device having a conversion efficiency comprising:

a coupler having at least first and second input ports and at least a first output port;

a first single mode waveguide fiber, propagating signal light pulses of wavelength $\lambda_s$, connected to the first input port;

a second single mode waveguide fiber, propagating pump light pulses of wavelength $\lambda_p$, connected to the second input port;

the signal pulses and the pump pulses exiting the coupler through the first output port which is connected to a first end of a third single mode waveguide fiber having a zero dispersion wavelength $\lambda_O$, the signal pulses and the pump pulses being synchronized to overlap at least partially for at least a portion of their travel time in the third waveguide fiber;

in which, $\lambda_p$ is greater than $\lambda_O$ and the third waveguide is characterized by a non-linearity constant greater than about 3 $(W\text{-}km)^{-1}$ and the conversion efficiency is not less than about 10 dB.

2. The device of claim 1 in which the third waveguide has a second end and the device further includes filtering means, operatively coupled to the third waveguide, near the third waveguide second end, for blocking further propagation of light of wavelength $\lambda_p$ in the third waveguide fiber.

3. The device of claim 2 in which the filtering means is an optical bandpass filter selected to reflect light of wavelength $\lambda_p$.

4. The device of claim 2 in which the filtering means is a wavelength dependent polarizer which passes $\lambda_s$ and reflects $\lambda_p$.

5. The device of claim 1 in which the third waveguide has $\lambda_O$ in the range of about 1500 nm to 1550 nm.

6. The device of claim 5 in which the third waveguide has $\lambda_O$ in the range of about 1520 nm to 1540 nm.

7. The device of claim 1 in which the signal light is converted into light having a wavelength $\lambda_v$ and $\lambda_v > \lambda_p > \lambda_s > \lambda_O$.

8. The device of claim 1 in which the signal light is converted into light having a wavelength $\lambda_w$ and $\lambda_s > \lambda_p > \lambda_w > \lambda_O$.

9. The device of claim 1 further including a polarization controller in the first or second single mode waveguide fiber to provide improved interaction of the pump light pulses and the signal light pulses within the third waveguide.

10. The device of claim 1 in which the total linear dispersion slope of the third waveguide, at a wavelength near $\lambda_O$, is in the range of about 0.03 ps/nm²-km to 0.10 ps/nm²-km.

11. The device of claim 1 in which the non-linearity constant of the third waveguide is in the range of about 3 $(W\text{-}km)^{-1}$ to 13 $(W\text{-}km)^{-1}$.

12. A wavelength conversion device comprising;
a non-linear loop mirror including a non-linear single mode optical waveguide fiber having a first and a second end, a zero dispersion wavelength $\lambda_o$, and, a non-linear index greater than about $3(W\text{-km})^{-1}$;
a first coupling means for coupling of signal pulses of wavelength $\lambda_s$ to the non-linear loop mirror fiber, propagating in one direction in the non-linear optical loop mirror;
a second coupling means for coupling pump pulses $\lambda_p$ to the non-linear loop mirror fiber, propagating in counter-current directions in the non-linear loop mirror; wherein, the pump and signal pulses are synchronized to overlap at least partially during at least a part of the time spent traversing the non-linear loop mirror so that the pump pulses convert the wavelength of the signal pulses, and pump energy is transferred to both the signal pulses and converted pulses; and, wherein,
the non-linear loop mirror is balanced to reflect the pump pulse wavelength, and, a third coupling means couples the signal and converted pulse wavelengths out of the non-linear loop mirror fiber.

13. The wavelength conversion device of claim 12 wherein the first, second and third coupling means comprise a single coupler having a first port for receiving the signal and pump pulses, a second port for delivering the signal pulses and a part of the power of the signal pulses to the first end of the non-linear loop mirror fiber, a third port for delivering a part of the power of the pump pulses to the second end of the non-linear optical loop mirror fiber, and a fourth port to pass the converted wavelength pulses and the signal pulses out of the non-linear loop mirror fiber.

14. The wavelength conversion device of claim 12 wherein the first coupling means is a tap coupler for coupling signal pulses into the non-linear optical mirror fiber to propagate in one direction, the second coupling means is a coupler having a port for receiving the pump signals and two ports connected to the first and second ends of the non-linear loop mirror fiber to couple pump signal power into each end of the non-linear loop mirror fiber, and the third coupling means is a tap coupler to couple signal pulses and converted pulses out of the non-linear optical loop mirror fiber.

15. A wavelength conversion device comprising:
a coupler having at least first and second input ports and at least a first output port;
a first single mode waveguide fiber, propagating signal light pulses of wavelength $\lambda_s$, connected to the first input port;
a second single mode waveguide fiber, propagating pump light pulses of wavelength $\lambda_p$, connected to the second input port;
the signal light pulses and the pump light pulses exiting the coupler through the first output port which is connected to a first end of a third single mode waveguide fiber having a zero dispersion wavelength $\lambda_O$, the signal pulses and the pump pulses being synchronized to overlap at least partially for at least a portion of their travel time in the third waveguide fiber;
in which, $\lambda_p$ is greater than $\lambda_O$, and the first waveguide fiber comprises a first single mode waveguide segment, in which total linear dispersion decreases in the direction of light propagation, and, a second single mode waveguide segment having substantially constant total linear dispersion.

16. The device of claim 15 in which the pump light pulses have a peak power in the range of about 550 mW to 650 mW, the bandwidth over which wavelength conversion takes place is in the range of about 30 nm to 50 nm, the peak wavelength conversion efficiency is in the range of about 25 dB to 30 dB, and the non-linearity constant of the third waveguide is in the range of about 3 $(W\text{-km})^{-1}$ to 13 $(W\text{-km})^{-1}$.

17. The device of claim 15 in which the total linear dispersion slope of the third waveguide near $\lambda_O$ is in the range of about 0.03 ps/nm²-km to 0.10 ps/nm²-km.

18. A method for converting wavelength of a light signal pulse comprising the steps:
a) launching signal light pulses of wavelength $\lambda_s$ into a first single mode waveguide fiber;
b) launching pump light pulses of wavelength $\lambda_p$ into a second single mode waveguide fiber;
c) by means of a coupler having at least two input ports and at least one output port, coupling the signal pulses and the pump pulses into a third single mode waveguide fiber having a zero dispersion wavelength $\lambda_O$ connected to the at least one coupler output port;
d) filtering the pump light pulses from the third waveguide at a position spaced apart from the at least one coupler output port; and,
e) synchronizing the signal pulses and the pump pulses so that at least a portion of the signal pulse overlaps in time at least a portion of the pump pulse over at least a portion of the travel time of the signal and pump pulses in the third waveguide;
in which, $\lambda_p > \lambda_o$ and the non-linearity constant of the third waveguide fiber is in the range of about 3 $(W\text{-km})^{-1}$ to 13 $(W\text{-km})^{-1}$.

19. The method of claim 18 in further including the step of optimizing the wavelength conversion bandwidth by selecting a third waveguide having a slope near $\lambda_o$ in the range of about 0.03 ps/nm²-km to 0.10 ps/nm²-km.

20. The method of claim 18 further including the step of shaping the signal pulse by means of a first waveguide fiber comprising a first waveguide segment, in which total linear dispersion decreases in the direction of light propagation, and, a second waveguide segment having substantially constant total linear dispersion.

21. The method of claim 18 further including the step of matching the polarization of the signal and pump pulses prior to the coupling of the signal and pump pulses into the third waveguide.

* * * * *